Dec. 26, 1939.　　　　J. MAROTO　　　　2,184,941
TRANSMISSION
Filed April 1, 1937　　　5 Sheets-Sheet 2
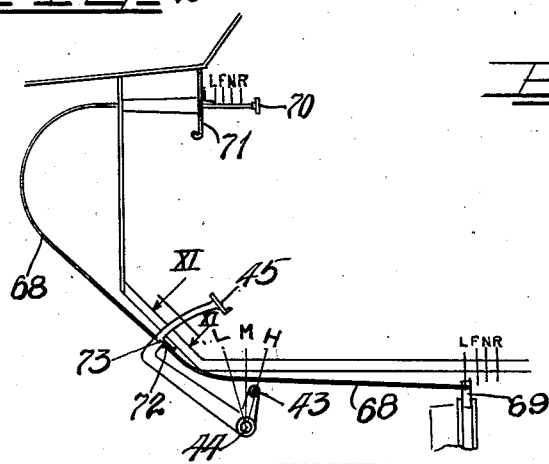
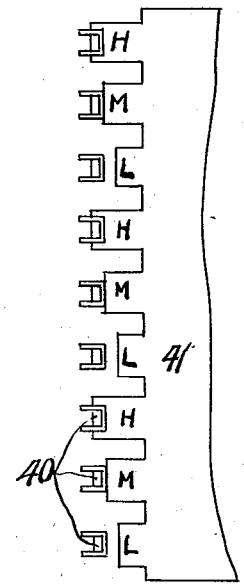
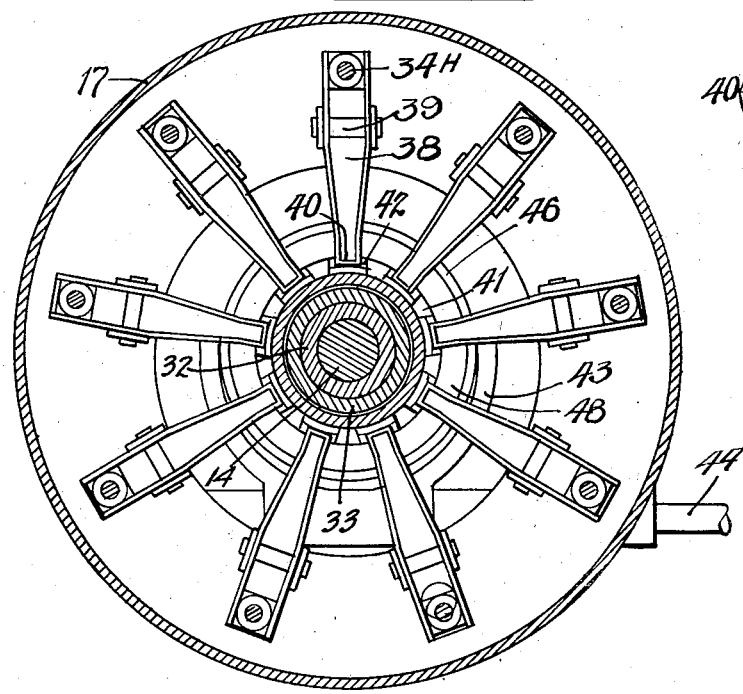
Inventor
Jorge Maroto.
by Charles Hill
Attys.

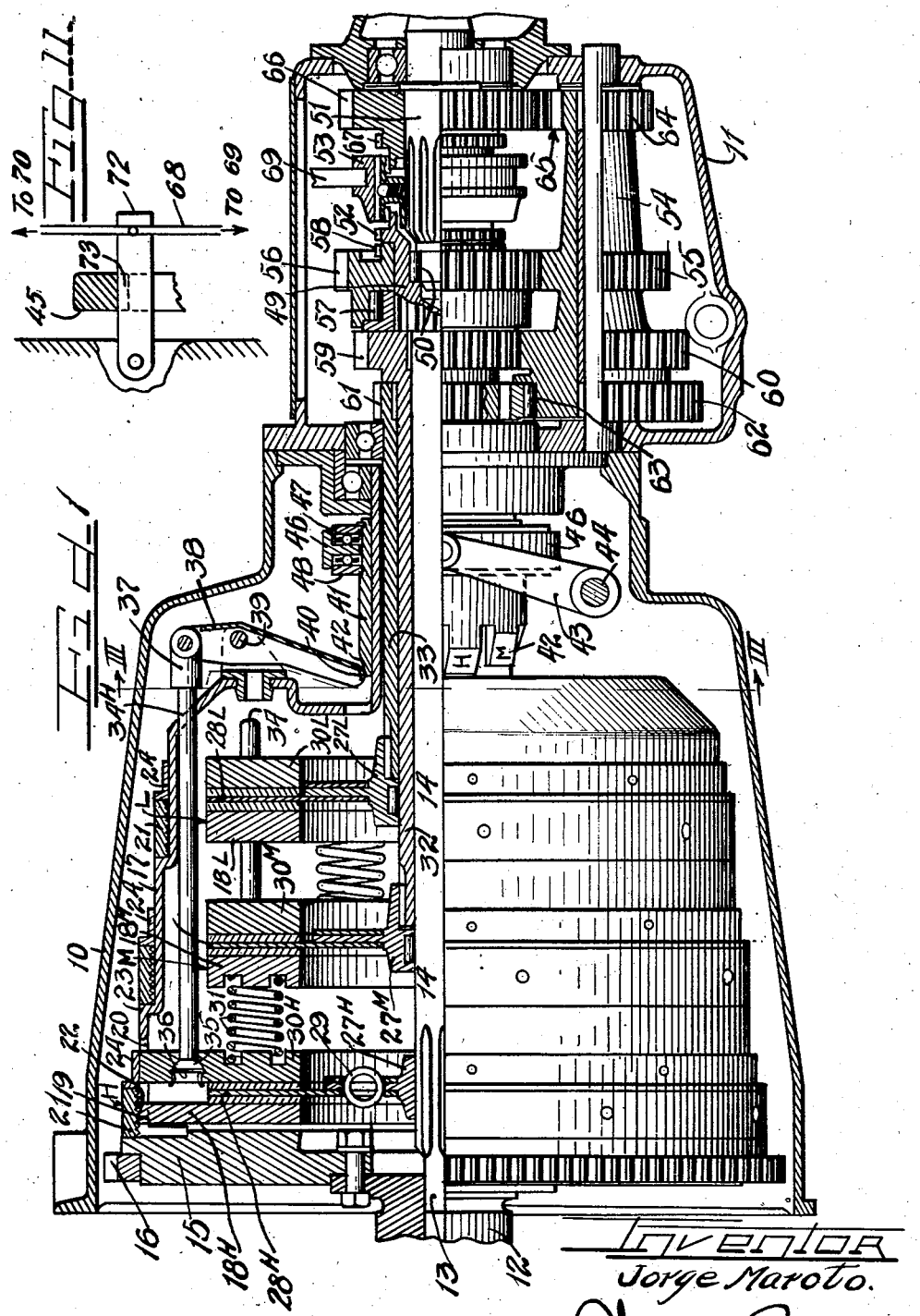

Dec. 26, 1939.  J. MAROTO  2,184,941
TRANSMISSION
Filed April 1, 1937  5 Sheets-Sheet 3
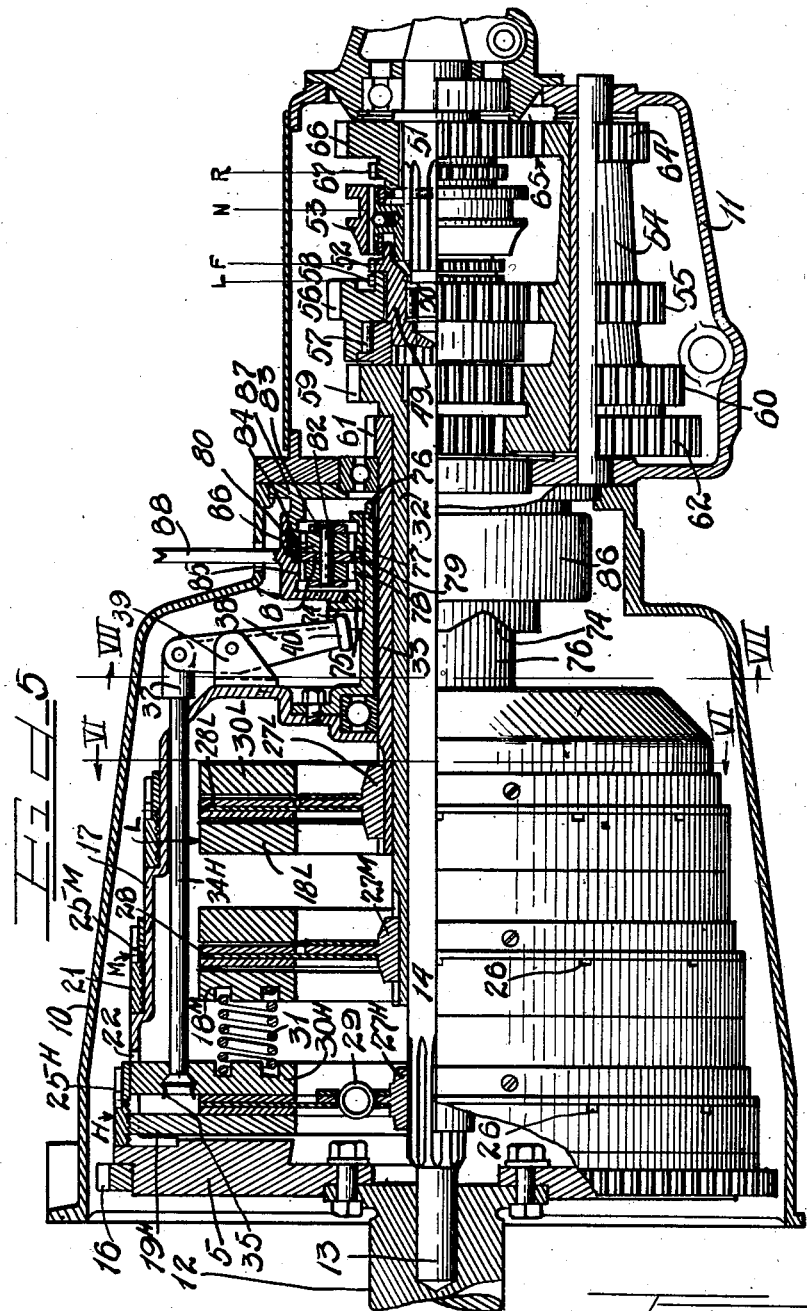
Inventor
Jorge Maroto
by
Attys.

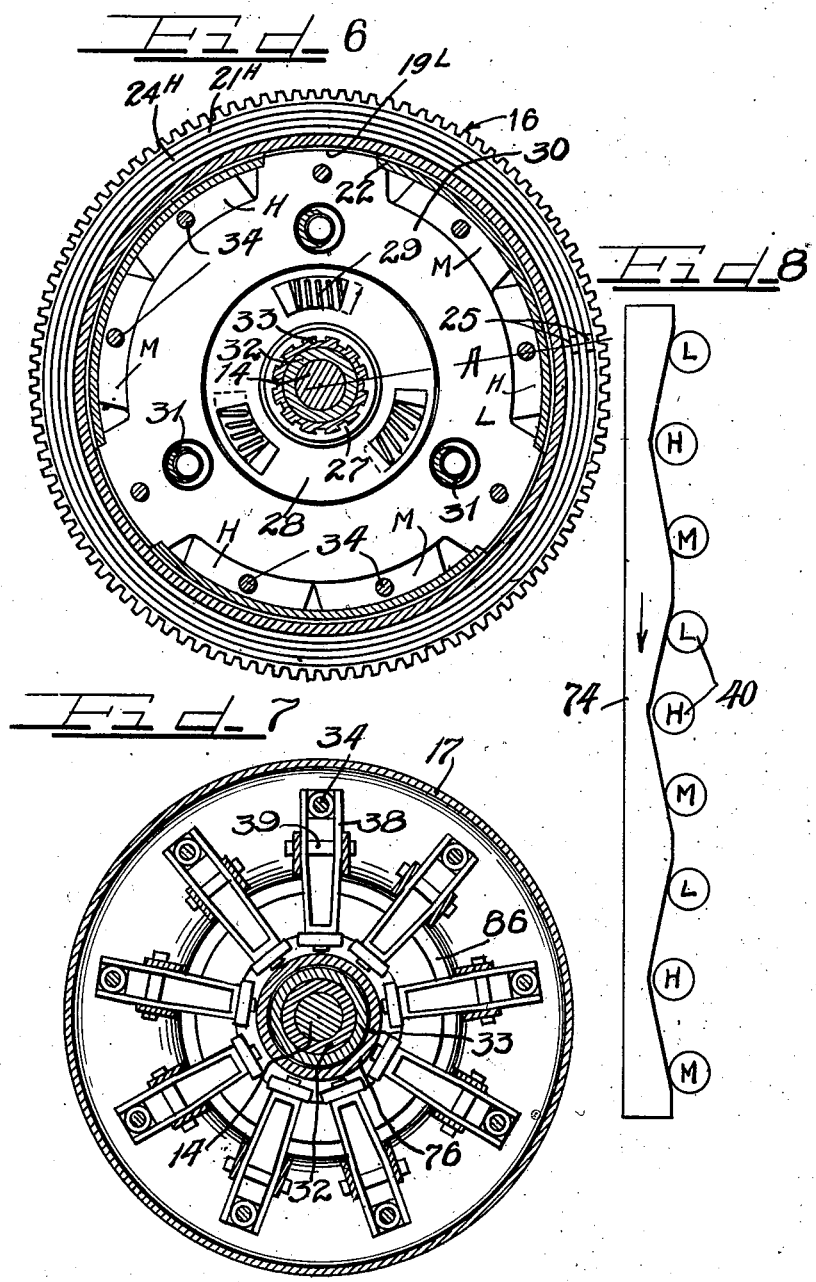

Dec. 26, 1939.    J. MAROTO    2,184,941
TRANSMISSION
Filed April 1, 1937    5 Sheets-Sheet 5
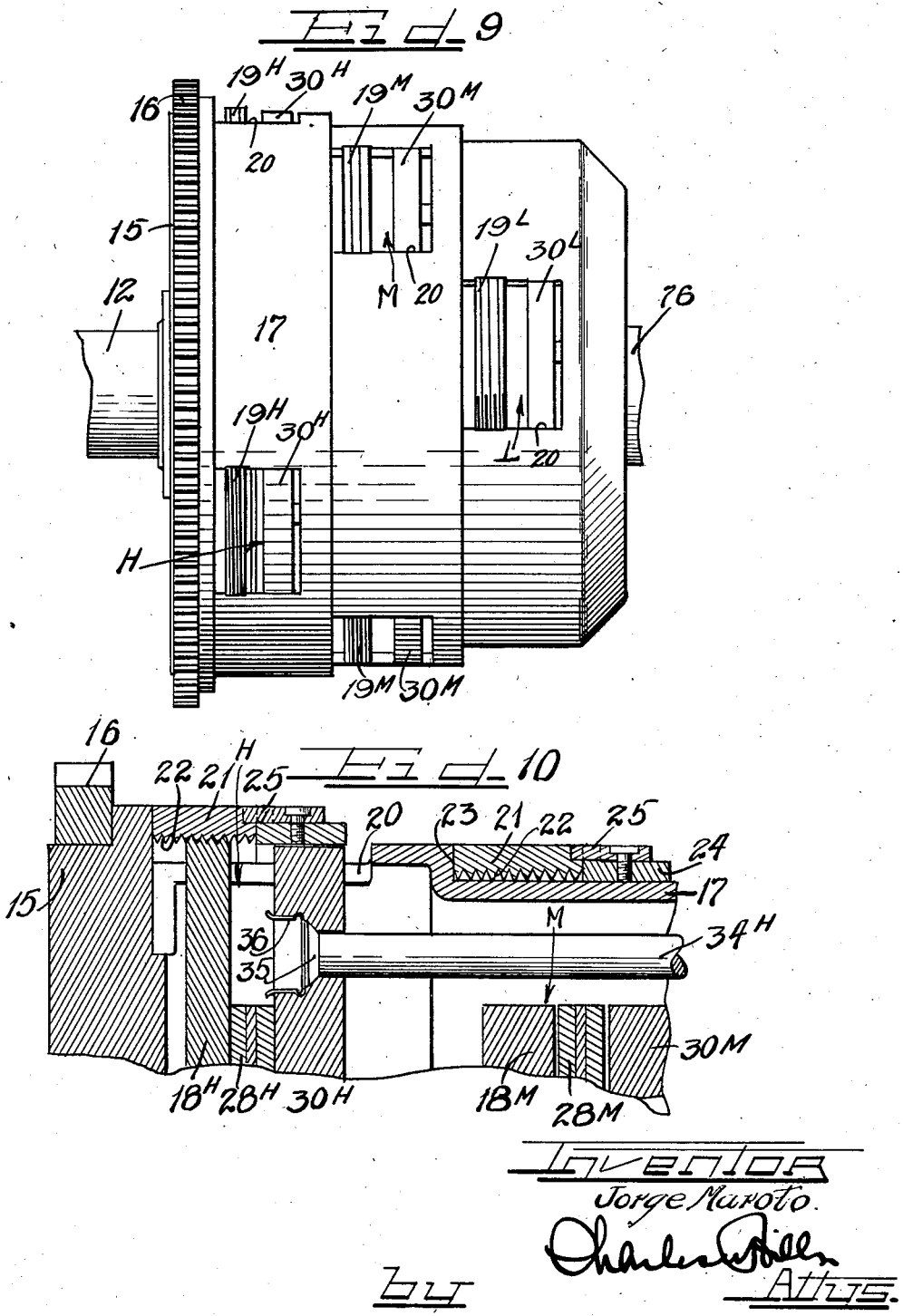

Patented Dec. 26, 1939

2,184,941

UNITED STATES PATENT OFFICE 2,184,941

TRANSMISSION

Jorge Maroto, Oak Park, Ill.

Application April 1, 1937, Serial No. 134,219

9 Claims. (Cl. 74—330)

This invention relates to variable speed power transmissions wherein a driven member is required to be operated at varying speeds relative to a prime mover.

It is an object of this invention to provide an improved and simplified variable speed power transmission mechanism wherein the varying speeds can be obtained sequentially by means of a single control, without requiring the operator to coordinate the operation of separate clutch and gear changing mechanisms. In its broad aspect, this invention is applicable as a variable speed transmission for general use, but for purposes of illustration, a particular type of transmission has been chosen, especially adapted for automotive service as part of the driving train between an internal combustion engine and the driving wheels of the vehicle, in which service a reverse drive is also required.

It is an important object of this invention to provide an improved power transmission mechanism of the class described wherein a plurality of driving ratios are provided by means of constant mesh gear trains, each gear ratio of which is individually engaged by a clutch associated therewith, the several clutches each controlling one gear train being so arranged as to be sequentially engaged or disengaged by a single control, as by a conventional clutch pedal in an automotive transmission.

It is a further object of this invention to provide a transmission of the type described which embodies one way clutch drives in connection with one or more of the constant mesh gear trains, whereby two or more of the clutches controlling different gear ratios may be engaged at the same time, the lower ratio or ratios overrunning through one or more one way clutches.

It is also an important object of this invention to provide an improved and simplified variable speed transmission of the constant mesh gear type wherein each reduction ratio is under the control of an individual clutch which is arranged to connect the driving or prime mover to the driven mechanism, thus eliminating both the need of a master clutch between the prime mover and the transmission proper, and the need of shifting mechanism or clutches in the transmission, except for locking one way clutches or providing for a reverse drive, as required in the case of automotive transmissions.

It is a further object of this invention to provide an improved and simplified power transmission mechanism that may be coupled to a prime mover to form a unit power plant so arranged as to be under the control of a single operating mechanism providing a neutral position as well as various speed ratios.

It is also an object of this invention to provide an improved and simplified transmission of the type described wherein a number of varying gear ratios may be progressively obtained through a single control while the transmission itself may be separately controlled to provide forward, neutral, and reverse connections in the transmission, as well as a free-wheeling lockup in forward drive.

It is a further object of this invention to provide an improved and simplified power transmission which can be economically manufactured and serviced and which will be capable of embodying wide variations in speed ratios without material alteration of the basic design.

Other and further important objects and features of this invention will more fully appear from the following detailed description, taken in connection with the accompanying drawings, which illustrate two embodiments of the invention, and in which:

Figure 1 is a longitudinal vertical section, partly in elevation, of a variable speed power transmission chosen to illustrate the preferred form of this invention as designed for automotive purposes;

Figure 2 is a fragmentary diagrammatic layout of a control system suitable for use with the transmission of Figure 1;

Figure 3 is a section on the line III—III of Figure 1, showing the clutch throwout fingers and operating cams therefor;

Figure 4 is a developed diagrammatic layout of the cam and the three sets of clutch throwout finger tips cooperating therewith;

Figure 5 is a longitudinal vertical section through a modified form of transmission case and bell housing showing both a partial elevation and a partial vertical section through a clutch and transmission mechanism embodying features of this invention;

Figure 6 is a section on the line VI—VI of Figure 5, showing the low speed clutch disk in elevation, the oblique line A corresponding to the vertical section in Figure 5;

Figure 7 is a section on the line VII—VII of Figure 5, showing the throwout mechanisms for the three clutches;

Figure 8 is a developed layout of the control cam of Figure 5 and the various clutch throwout finger rollers, the particular position shown corresponding to high or direct drive clutch engagement;

Figure 9 is a fragmentary plan view of the clutch housing shell common to both Figures 1 and 5 with the adjusting and clamp rings omitted to show the adjustment of the driving disks of the several clutches; and Figure 10 is an enlarged fragmentary section showing details common to both Figures 1 and 5 of the adjusting and clamp rings as engaged with one lug of the high speed clutch driving disk.

Figure 11 is an enlarged fragmentary section on the line XI—XI of Figure 2 showing the detent 72 engaged with the clutch pedal to prevent full return thereof.

As shown on the drawings:

The transmission chosen to illustrate the first embodiment of this invention comprises a three speed forward, neutral, and two speed reverse type of constant mesh transmission, each speed being under the control of an individual clutch, preferably progressively operated by a single control, which may be the usual clutch pedal or a remote control, so linked to the transmission control that when the clutch pedal is all the way down, all the clutches are released, and upon return movement of the clutch pedal, the low, medium, and high gear ratios in the transmission will be progressively engaged. The reverse control may be obtained manually, as by a dash-mounted or remote control, a further refinement of the manual control providing reverse, neutral, forward free-wheeling in medium and low, and forward with free-wheeling locked, by the progressive movement of a single manual control analogous to the well-known free-wheel lockout control.

Since the transmissions chosen for illustrative purposes comprise three forward speeds, with individual clutches associated therewith, it is believed that it will facilitate tracing the path of power flow to use the affixes "L" to represent low or first speed, "M" to represent intermediate or second speed, and "H" to represent third speed or direct drive.

The illustrated embodiments of this invention comprise a bell housing 10, intended to be applied to a corresponding opening at the rear of an internal combustion engine, the housing inclosing clutching mechanisms to be described hereinafter, and supporting at its rear end a gear box 11 containing various transmission gears. The rear end of an engine crankshaft 12 is fragmentarily shown in Figure 1 as having a pilot bearing 13 for a clutch shaft 14, and as carrying a conventional flywheel 15 on its end, the flywheel having the usual starting ring gear 16 applied thereto. A clutch housing 17 is secured in any suitable manner on the rear face of the flywheel and incloses a series of independent clutches comprising in order substantially identical high speed, intermediate speed, and low speed mechanisms, to which the same numerals will be applied, with the affixes "H", "M", and "L" to identify the different clutches. Each clutch comprises a driving plate 18 having three or more outstanding lugs 19 projecting through slots 20 in the clutch housing, which latter is stepped down in diameter after each clutch mechanism to facilitate assembly of the different clutches. The driving plates 18 are arranged for independent adjustment by means of internally threaded rings 21 slipped over the periphery of the clutch housing and engaging threads 22 on the periphery of the clutch lugs 19, the rings 21 being held against shoulders 23 on the housing by means of shouldered rings 24 secured to the housing, one or more keys 25 (shown in Figures 5 and 10) being held in slots in the ring 24 and projecting into one of several recesses 26 in the threaded rings 21 to permit locking the rings 21 in a number of positions.

The clutch shaft 14 carries a hub 27H for a driven disk 28H for the high or direct drive, which disk may conveniently incorporate spring connections 29 between the disk and its hub. When the clutch is to be engaged, a pressure plate 30H is released to move to the left under the pressure of springs 31 to clamp the driven disk 28 against its driving plate 18, thus transmitting engine torque to the clutch shaft 14. The medium speed clutch is identical with that just described except that the lugs 19M of the driving plate 18M are of smaller diameter, and the driven disk hub 27M is splined to a sleeve 32 concentric with the clutch shaft 14. Similarly, the low speed clutch is identical with the other two except for a smaller diameter of the driving plate lugs 19L, and its driven disk hub 27L is splined to a second sleeve 33 enveloping the sleeve 32.

The three clutch pressure plates 30 are each retracted to release the corresponding driven disks 28, by means of headed pull rods 34, the heads 35 of which are held in seats in the pressure plates 30 by springs 36. Each pressure plate is provided with three or more equally spaced pull rods 34 which are adjustably threaded into sockets 37 pinned to throwout levers 38 fulcrumed at 39 to the clutch housing 17. The free ends 40 of the throwout levers 38 are axially shifted by means of a cam 41 having the same number and spacing of lobes 42 as there are levers. As will be seen from Figures 3 and 4, the throwout levers 38 and pull rods 34 alternate in regular order for the three clutches, and the lobes 42 of the cam serve to release sequentially the three clutches as the cam 41 is shifted to the left in Figure 1. In the position shown, all three clutches are engaged and the transmission is thus in direct drive with the intermediate and low speed drives being overrun through one way roller clutches in the transmission, as will be presently described. The cam 41 may conveniently be operated by a shifter fork 43 carried by a clutch pedal shaft 44 operated by a clutch pedal 45, the shifter fork 43 engaging a collar 46 between ball-thrust bearings 47 which act against races 48 carried by the cam 41. From the layout of Figure 4, it will be evident that the first and every following third lobe 42H of the cam, counting down from the top, acts on the throwout levers 38H controlling the high speed clutch, before the remaining lobes contact their throwout levers, so that on depressing the clutch pedal 45 the high speed clutch is first disengaged. Further clutch pedal depression next disengages the medium speed clutch, and finally still further movement disengages the low speed clutch, so that all three clutches are then disengaged by the operation of the clutch pedal. Conversely, as the pedal is released, first the low speed clutch engages, next the medium speed clutch, and finally the high speed clutch, when all pressure is removed from the pedal 45.

The illustrated transmission is of the constant mesh type wherein the clutch shaft 14 terminates in a hub 49 having an internal pilot bearing 50 for a transmission tail shaft 51, and external teeth 52 for engagement by a shifting jaw clutch 53 splined on the tail shaft 51. High gear or direct drive thus provides for coupling of the clutch shaft 14 to the tail shaft 51.

Low and medium speeds are obtained through a countershaft gear cluster 54, gear 55 thereof driving a gear 56 journaled on the hub 49 of clutch shaft 14. The gear 56 drives the hub 49 through a one way roller clutch 57, so that low and medium speeds may free-wheel, while teeth 58 are associated with the gear 56 so that a further forward shift of the jaw clutch shifter to engage the teeth 58 will lock the gear 56 to the hub 49, thus locking out the free-wheeling feature. Intermediate or medium speed drive is obtained from a gear 59 carried by the medium speed sleeve 32, which gear 59 meshes with a gear 60 on the countershaft. Similarly, low speed is obtained from a gear 61 carried by the second or low speed sleeve 33, which gear 61 meshes with a gear 62 on the countershaft. The gear 62 has a one way roller clutch 63 driving the countershaft to permit overrun thereof when the medium speed clutch is engaged. In either case, power flows from either gear 59 or 61 to the countershaft and from gear 55 on the countershaft to gear 56 on the hub 49.

Reverse can be obtained from either the low or medium speed drives to the countershaft, through a gear 64 on the countershaft which meshes with an idler gear 65 in turn driving a gear 66 rotatably mounted on the tail shaft and carrying jaw teeth 67 engageable by the shifter clutch by a backward movement from the position shown. The shifter need move only in a straight line analogous to the well-known free-wheeling lockouts, so that the control hereof may be arranged in any manner suitable to the installation. As shown diagrammatically in Figure 2, a push-pull Bowden wire 68 may be fastened to a shifter fork 69 engaging the shifting collar 53, the Bowden wire 68 extending to a knob 70 on the instrument panel 71 of the vehicle. In both Figures 1 and 5, the transmission shifter has been shown in neutral for clearness, but in Figure 2 the knob 70 has been pulled all the way out to lock out the free-wheeling. This position is indicated by the lines marked "L" at the shifter and dash respectively. When the knob 70 is pushed in sufficiently to bring the spot marked F into the position L, the shifter 53 will move to the position marked F in the transmission, wherein forward free-wheeling drive in medium and low is obtained. Similarly, shifting to the position N provides neutral, while the position R provides reverse.

The foregoing described control is applicable to both transmissions disclosed herein, but since the transmission of Figures 1, 3, and 4 is designed to operate in high or direct drive with all three clutches engaged, it is necessary that the transmission shifter be set in F whenever the high or direct drive clutch is engaged. To provide for this feature, an interlock between the clutch pedal 45 and the shifter control is provided, which, as shown in Figure 2, may comprise a detent 72 operated by the Bowden wire 68 to engage a shoulder 73 on the shank of the clutch pedal to prevent its return to high or direct drive when the shifter knob 70 is pulled all the way out to lock the free-wheeling clutch. When the knob is shifted to forward free-wheeling position, the detent 72 releases the clutch pedal which can then return to its normal or direct drive position. With this arrangement the clutch pedal shoulder prevents operation of the shifter 53 into lock-up position, unless the pedal is depressed sufficiently to release the high or direct drive clutch.

The second form of transmission disclosed in Figures 5 to 10 is designed to have the clutches engaged only one at a time; i. e., in high or direct drive, only the high speed clutch is engaged. These clutch and transmission structures are practically identical with those heretofore described, except for the type of clutch control mechanism, so that the same reference numerals have been used throughout, with the exception of the clutch control. This control comprises a cam 74 which selectively actuates the desired clutch throwout fingers.

It will be evident that the cam 74 must rotate with the clutch housing and throwout levers, while being angularly movable relative thereto to provide for engagement of the several clutches as desired. To this end the cam is formed as part of a sleeve 75 mounted on a sleeve-like extension 76 of the clutch housing 17, to which is keyed a driving sun gear 77 of a planetary gear train. The cam sleeve 75 carries a sun gear 78 identical with the driving sun gear, the two gears being separated by a hardened race ring 79 of the same diameter as the pitch diameter of the gears. Several pairs of identical but independent pinions 80, spaced by washers 81 having a diameter the same as the pitch diameter of the pinions, are freely mounted on pins 82 held in shroud rings 83, the pinions meshing with the sun gears 77 and 78, and with internal gears 84 and 85, while the spacing washers 81 ride against an enveloping ring 86 which maintains proper pinon and gear meshing. The internal gear 84 is formed as part of an end closure 87 for the bell housing, while the internal gear 85 is guided on a shoulder of the end closure 87 and is externally shiftable or rotatable by linkage connected to a lever 88 to vary the angular relationship of the cam 74 and its sun gear 78 relative to the sun gear 77. With this arrangement, as long as the lever 88 is held stationary, the cam 74 and its sun gear 78 rotate in exact step with the driving sun gear 77, and consequently in step with the clutch housing 17 and throwout levers 38, so that the clutch setting corresponding to a given position of the lever 88 is always the same. When the lever 88 is shifted angularly, it serves to rotate the left hand pinions 80 relative to the right hand ones, and thus produces an angular movement of the cam sun gear 78 and the cam 74 which alters the relative clutch positions. Referring to Figure 8, wherein the cam 74 is shown in its developed length, with the high gear throwout lever ends 40H released to cause engagement of the high gear clutch as in Figure 5, a relative downward movement of the developed cam 74, equal to the spacing of adjacent rollers, will cause release of the high gear clutch and engagement of the medium gear clutch, while the low gear clutch remains disengaged. An equal further movement of the cam would cause engagement of the low speed gear clutch while both the high and medium speed clutches become disengaged. A further movement equal to half the roller spacing would result in disengagement of all three clutches, as occurs in an intermediate position between the previously described shifts. Only a relatively small angular movement of the lever 88 is required to control all three clutches, since in this particular case the cam movement required is 100° and can be accomplished with about 60° movement of the lever 88, if the ratio of gears 78 and 85 is 6 to 10. The lever 88 can be linked to the clutch pedal 45 in any convenient manner whereby, when the pedal is released, in the position of Figure 2, the H clutch will be engaged, the transmission shifter 53 being operated in the same way as previously described although the detent 72 may be omitted.

Assuming that the transmission is in the condition shown in Figure 5, wherein the high speed clutch is engaged and the transmission shifter 53 in neutral position, the engine may be started and idled as in a conventional automotive installation. When it is desired to start the vehicle, the clutch control lever 88 is shifted all the way over, thus disengaging all three clutches, and the shifter control knob 70 is then actuated to engage the shifter 53 with either the forward or reverse gear teeth 52 or 67, according to the direction of motion desired. After this shift has been made, the clutch control is partially released to engage the low speed clutch, which then drives, through sleeve 33, gear 61 to countershaft gear 62 and from countershaft gear 55 to gear 56 on the hub 49 (for forward drive), through the one way roller clutch 57 to the hub 49, thence through the teeth 52 to the shifter 53, which drives the tail shaft. A further movement of the clutch control lever 88, corresponding to a further release of a conventional clutch pedal, releases the low speed clutch and engages the second or medium speed clutch, which drives the countershaft through sleeve 32, gear 59 to countershaft gear 60 and thence through the train described for low gear drive. The final movement of the clutch control lever 88, corresponding to complete release of a conventional clutch pedal, results in release of the medium speed clutch and engagement of the high speed or direct drive clutch, which drives the hub 49 directly through the clutch shaft 14.

When reverse instead of forward is engaged by moving the shifter 53 backwards to engage teeth 67 on reverse gear 66, the drive may be taken through either the low or medium speed clutches and their corresponding gear trains, thus providing two speeds in reverse at the will of the operator.

While the disclosed embodiments of this invention are particularly intended for automotive purposes, it will be readily apparent that they are equally applicable to other uses requiring a variable speed power transmission between a prime mover and the mechanism to be driven. Further, it will be evident that the particular clutch and gear box arrangement may be varied to produce other or more or less reduction ratios.

It will thus be seen that I have invented a new and improved transmission of the variable speed constant mesh gear type wherein transitions from one speed ratio to another may be made smoothly without engine racing or gear shifting, thus eliminating the high degree of manual skill and dexterity required to coordinate the operation of throttle, clutch, and gear shift in a conventional transmission. With the transmission disclosed it is possible to secure faster acceleration through the several gear ratios, especially in difficult situations such as starting uphill or in mud or when the driver's attention would be required by external conditions. It will be evident also that eliminating manual gear shifting will economize in fuel because of the more continuous driving conditions and easy transition between gear ratios.

I am aware that many changes may be made and numerous details of construction may be varied throughout a wide range without departing from the principles of this invention, and I, therefore, do not purpose limiting the patent granted hereon otherwise than necessitated by the prior art.

I claim as my invention:

1. A variable speed power transmission including a case, driving means, a driving shaft, a driven shaft, means for coupling the driving shaft to the driven shaft for direct drive, a plurality of reducing gear trains including a countershaft, means for transmitting power from said countershaft to the driven shaft, including a one way clutch incorporated in the drive from the countershaft to the driving shaft whereby the driving shaft can overrun the reducing gear trains, means associated with said coupling means and said one way clutch for locking out said one way clutch at will, separate clutches for coupling the driving means to the driving shaft and to each of said reducing gear trains, and means for sequentially engaging or disengaging said clutches.

2. A variable speed power transmission including a case, driving means, a driving shaft, a driven shaft, means for coupling the driving shaft to the driven shaft for direct drive, a plurality of reducing gear trains including a countershaft, means for transmitting power from said countershaft to the driven shaft, including a one way clutch incorporated in the drive from the countershaft to the driving shaft whereby the driving shaft can overrun the reducing gear trains, a reverse drive also provided between said countershaft and said driven shaft, means associated with the coupling means for engaging said reverse drive, separate clutches for coupling the driving means to the driving shaft and to each of said reducing gear trains, and means for sequentially engaging or disengaging said clutches.

3. A variable speed power transmission including a case, driving means, a driving shaft, a driven shaft, means for coupling the driving shaft to the driven shaft for direct drive, a plurality of reducing gear trains including a countershaft, means for transmitting power from said countershaft to the driven shaft, including a one way clutch incorporated in the drive from the countershaft to the driving shaft whereby the driving shaft can overrun the reducing gear trains, means associated with said coupling means and said one way clutch for locking out said one way clutch at will, controlling means for said coupling means to provide lock-out, forward, and neutral by shifting said coupling means, separate clutches for coupling the driving means to the driving shaft and to each of said reducing gear trains, and means for sequentially engaging or disengaging said clutches.

4. A variable speed power transmission including a case, driving means, a driving shaft, a driven shaft, means for coupling the driving shaft to the driven shaft for direct drive, a plurality of reducing gear trains including a countershaft, means for transmitting power from said countershaft to the driven shaft, including a one way clutch incorporated in the drive from the countershaft to the driving shaft whereby the driving shaft can overrun the reducing gear trains, a reverse drive also provided between said countershaft and said driven shaft, means associated with the coupling means for engaging said reverse drive, means associated with said coupling means and said one way clutch for locking out said one way clutch at will, controlling means for said coupling means to provide lock-out, forward, neutral, and reverse by shifting said coupling means, separate clutches for coupling the driving means to the driving shaft and to each of said reducing gear trains, and means for sequentially engaging or disengaging said clutches.

5. A variable speed power transmission including a plurality of gear trains providing different reduction ratios as well as direct drive, separate clutches for each of said gear trains and for direct drive, overrunning clutch means associated with the gear trains whereby all of the separate clutches may be engaged at once, means for locking out one of said overrunning clutch means at will, and means associated with said lock-out means for preventing engagement of the direct drive clutch when said lock-out means is operated.

6. A variable speed power transmission including a plurality of gear trains providing different reduction ratios as well as direct drive, separate clutches for each of said gear trains and for direct drive, overrunning clutch means associated with the gear trains whereby all of the separate clutches may be engaged at once, means for progressively engaging said clutches whereby the drive will be initially transmitted through the lowest ratio gear and finally through direct drive, means for locking out one of said overrunning clutch means at will, and means associated with said lock-out means for preventing engagement of the direct drive clutch when said lock-out means is operated.

7. A variable speed power transmission including a plurality of different ratios provided by gear trains for transmitting power to a driven mechanism, independent single disc clutches associated with the driving gears of each of said gear trains, a housing enveloping said clutches, means associated with said housing to individually adjust the position of the fixed member of each clutch therein, and operating means for sequentially disconnecting each of said clutches.

8. A variable speed power transmission including a plurality of different gear ratios, individual clutches controlling the transmission of power through each of the gear ratios, said clutches comprising driving and pressure plates, a housing enveloping the several clutches and making driving engagement with the driving plate of each clutch, means for independently adjusting the position of each driving plate in said housing, and means for sequentially disconnecting said clutches comprising a single cam sleeve, and a plurality of throwout mechanisms operated thereby to retract the individual pressure plates of each clutch.

9. A variable speed power transmission including a plurality of different constant mesh gear ratios, individual clutches controlling the transmission of power through each of the gear ratios, said clutches comprising driving and pressure plates, a housing enveloping the several clutches and making driving engagement with the driving plate of each clutch, means for independently adjusting the position of each driving plate in said housing, means for sequentially disconnecting said clutches comprising a single cam sleeve, and a plurality of throwout mechanisms operated thereby to retract the individual pressure plates of each clutch, and overrunning clutch means associated with one or more of said constant mesh gear trains to permit engagement of more than one clutch at a time.

JORGE MAROTO.